United States Patent
Nakamura

(10) Patent No.: US 12,174,865 B2
(45) Date of Patent: Dec. 24, 2024

(54) INFORMATION PROCESSING APPARATUS, INFORMATION PROCESSING SYSTEM, AND INFORMATION PROCESSING METHOD

(71) Applicant: Kazuaki Nakamura, Kanagawa (JP)

(72) Inventor: Kazuaki Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/863,403

(22) Filed: Jul. 13, 2022

(65) Prior Publication Data

US 2023/0019982 A1  Jan. 19, 2023

(30) Foreign Application Priority Data

Jul. 19, 2021 (JP) ................................ 2021-118460

(51) Int. Cl.
| | | |
|---|---|---|
| G06F 16/332 | (2019.01) | |
| G06F 16/33 | (2019.01) | |
| H04L 51/02 | (2022.01) | |
| H04L 51/216 | (2022.01) | |

(52) U.S. Cl.
CPC ...... *G06F 16/3329* (2019.01); *G06F 16/3344* (2019.01); *H04L 51/02* (2013.01); *H04L 51/216* (2022.05)

(58) Field of Classification Search
CPC .................................................. G06F 16/3329
See application file for complete search history.

(56) References Cited

U.S. PATENT DOCUMENTS

| | | | |
|---|---|---|---|
| 2017/0372190 A1* | 12/2017 | Bishop | G06F 16/00 |
| 2018/0063491 A1 | 3/2018 | Nakamura | |
| 2019/0066136 A1* | 2/2019 | Kopikare | G06N 5/046 |
| 2020/0026734 A1 | 1/2020 | Mohri | |
| 2020/0106723 A1 | 4/2020 | Nakamura | |
| 2021/0092080 A1* | 3/2021 | Kitoh | H04L 51/046 |
| 2021/0168097 A1 | 6/2021 | Nakamura | |

FOREIGN PATENT DOCUMENTS

| | | |
|---|---|---|
| JP | 2019-036210 | 3/2019 |
| JP | 2019-219737 | 12/2019 |
| JP | 2020-013492 | 1/2020 |
| JP | 2020-057117 | 4/2020 |
| JP | 2021-149341 | 9/2021 |

* cited by examiner

*Primary Examiner* — Van H Oberly
(74) *Attorney, Agent, or Firm* — XSENSUS LLP

(57) ABSTRACT

An information processing apparatus including circuitry. The circuitry receives a question from one of a user terminal apparatus and an administrator terminal apparatus. The circuitry performs determination as to whether the question is transmitted from the user terminal apparatus or transmitted from the administrator terminal apparatus. The circuitry searches for one or more answers including a word included in the question. The circuitry calculates a weighting of each of the one or more answers. When the determination result indicates that the question is transmitted from the user terminal apparatus, the circuitry transmits an answer having a weighting satisfying a predetermined threshold value of the weighting to the user terminal apparatus. When the determination result indicates the question is transmitted from the administrator terminal apparatus, the circuitry generates screen information of a screen for editing at least one of one or more answers.

20 Claims, 19 Drawing Sheets

FIG. 4

| QUESTION ID (71) | UPDATE DATE AND TIME (72) | CATEGORY (73) | QUESTION SENTENCE (74) | ALTERNATIVE EXPRESSION OF QUESTION (75) | ANSWER SENTENCE (76) |
|---|---|---|---|---|---|
| ... | ... | ... | ... | ... | ... |
| 0105 | 2021/06/01 10:00:00 | PURCHASE CONSIDERATION | Any information on seminars? | Any information on workshops? | We regularly hold online seminars (webinars) on the product overview and how to use.<br>The date and time of the online seminar is as follows.<br>Please join us.<br>July 1, 2021 13:00–15:00<br>[Click here to apply for the online seminar]<br>(https://.../...) |
| 0106 | 2021/06/01 11:00:00 | EXAMPLE OF INTRODUCTION | Examples of the applications to inquiries from outside the company | Examples of the application to inquiries from customers | In a certain manufacturing industry, the number of telephone inquiries from customers is reduced by 50%, thus reducing overtime.<br>In addition, people feel more free to ask questions to a chatbot. Thus, customers' needs... |
| ... | ... | ... | ... | ... | ... |

| CONVER-SATION ID (81) | CONVER-SATION DATE AND TIME (82) | CATEGORY (73) | QUES-TION ID (71) | QUESTION SENTENCE (74) | ANSWER SENTENCE (76) |
|---|---|---|---|---|---|
| ... | ... | ... | ... | ... | ... |
| 00012345 | 2021/06/01 10:00:00 | PURCHASE CONSID-ERATION | 0105 | Any information on seminars? | We regularly hold online seminars (webinars) on the product overview and how to use. The date and time of the online seminar is as follows. Please join us. July 1, 2021 13:00-15:00 [Click here to apply for the online seminar] (https://.../.../...) |
| 00012346 | 2021/06/01 11:00:00 | EXAMPLE OF INTRO-DUCTION | 0106 | Examples of the applications to inquiries from outside the company | In a certain manufacturing industry, the number of telephone inquiries from customers is reduced by 50%, thus reducing overtime. In addition, people feel more free to ask questions to a chatbot. Thus, customers' needs... |
| ... | ... | ... | ... | ... | ... |

| SCREEN TYPE | SCREEN NAME | SCREEN IDENTIFICATION INFORMATION |
|---|---|---|
| USER SCREEN | CONVERSATION SCREEN | ChatScreen |
| | SIMULATION SCREEN | SimuScreen |
| | ... | ... |
| ADMINISTRATOR SCREEN | CONVERSATION HISTORY LIST SCREEN | HistoryListScreen |
| | QUESTION AND ANSWER LIST SCREEN | FAQListScreen |
| | ... | ... |

| QUES-TION ID 71 | QUESTION SENTENCE 74 | ALTERNATIVE EXPRESSION OF QUESTION 75 | ANSWER SENTENCE 76 |
|---|---|---|---|
| ... | ... | ... | ... |
| 0105 | Any information on seminars? | Any information on workshops? | We regularly hold online seminars (webinars) on the product overview and how to use. The date and time of the online seminar is as follows. Please join us. July 1, 2021 13:00-15:00 [Click here to apply for the online seminar] (https://.../.../...) |
| 0106 | What is the content of the seminar? | What is the content of the workshop? | In the seminar, for Product A ....... ..Product A......... .........Product A......... ................Product A. |
| ... | ... | ... | ... |

SEARCH KEYWORD: "seminar", "date and time"

QUESTION ID: 0105
 TOTAL NUMBER OF KEYWORDS = 100 (Seminar information × 1 + Workshop × 1 + Product overview × 1 + How to use × 1 + ...)
 NUMBER OF DETECTED KEYWORDS INCLUDED IN TEXT TO BE SEARCHED = 5 (seminar × 4 + date and time × 1)
 SEARCH SCORE = 0.05 (5/100)

QUESTION ID: 0110
 TOTAL NUMBER OF KEYWORDS = 200 (seminar × 2 + workshop × 1 + Product A × 10 + ...)
 NUMBER OF SEARCH KEYWORDS INCLUDED IN TEXT TO BE SEARCHED = 2 (seminar × 2)
 SEARCH SCORE = 0.01 (2/200)

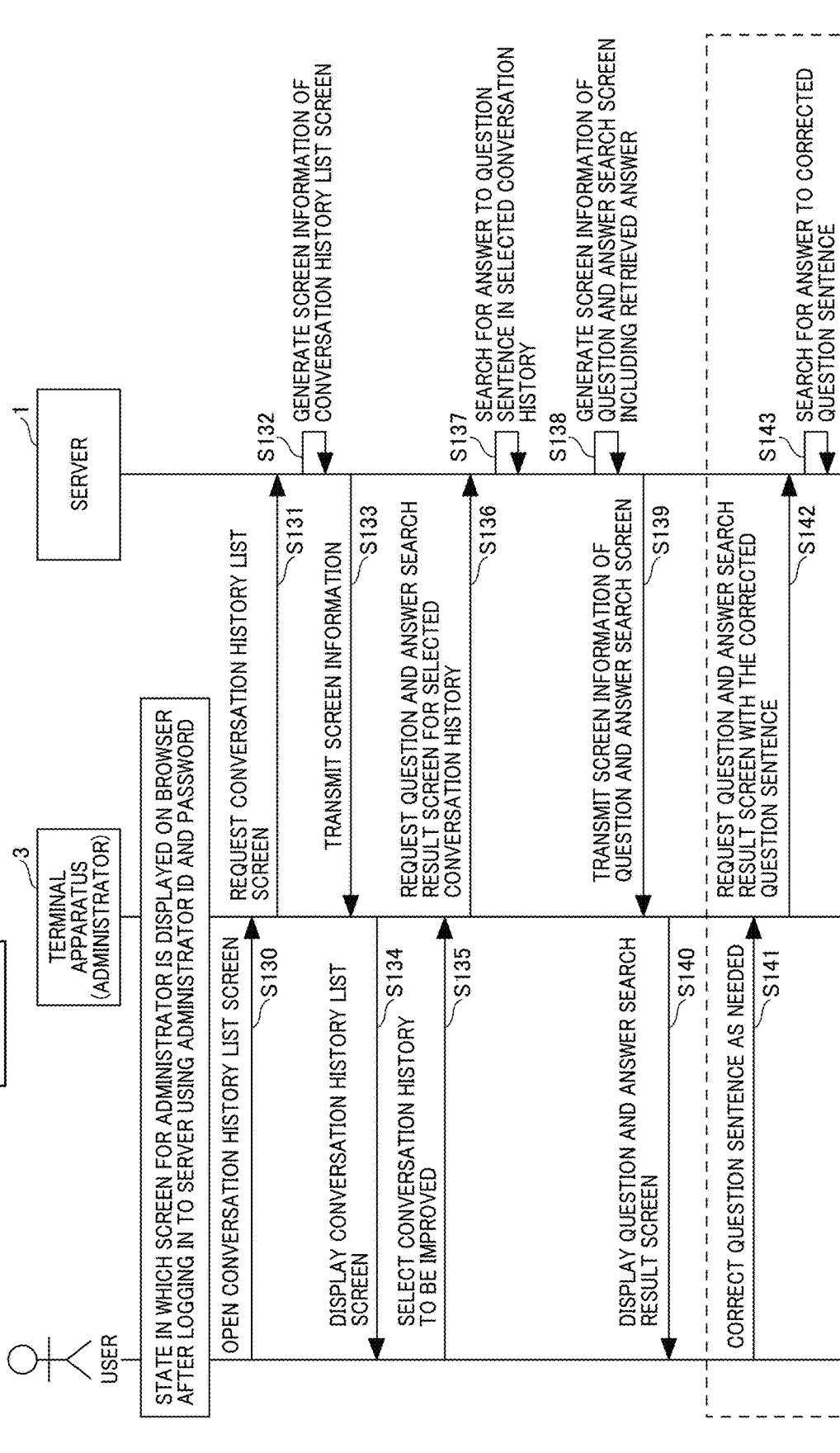

FIG. 13

Conversation History List Screen ~220

Period: 2020/06/01–2020/06/18    All categories ~222

| | Date and time 223 | Category 224 | Chat ID 225 | Answer by chatbot 226 | Input by Questioner 227 | Evaluation 228 |
|---|---|---|---|---|---|---|
| 229 Search request | 2021/06/01 10:00:00 | Purchase consideration | 00012345 | We regularly hold online seminars (webinars) on the product overview and how to use. Please join us. The date and time of the online seminar is as follows. July 1, 2021 13:00–15:00 [Click here to apply for the online seminar] (https://.../.../...) | Any information on seminars? | Satisfied |
| 229 Search request | 2021/06/01 11:00:00 | Example of introduction | 00012346 | In a certain manufacturing industry, the number of telephone inquiries from customers is reduced by 50%, thus reducing overtime. In addition, people feel more free to ask questions to a chatbot. Thus, customers' needs... | Examples of the applications to inquiries from outside the company | Satisfied |
| | ... | ... | ... | ... | ... | ... |
| 229 Search request | 2021/06/15 13:00:00 | Purchase consideration | 00012350 | — | Webinar | None |

FIG. 15

Question and answer edit screen ~250

Select the category

[Purchase consideration ▼] ~251

Enter the question and answer

[Any information on seminars?] ~252

~253
We regularly hold online seminars (webinars) on the product overview and how to use.
The date and time of the online seminar (webinar) is as follows. Please join us.
July 1, 2021  13:00-15:00
[Click here to apply for the online seminar (webinar)]
(https://.../.../...)

Alternative expression of question

[Any information on webinars?] 🗑 ~254

[+ Add]

[ Save ] ~255

FIG. 17

SEARCH KEYWORD: "webinar", "date and time"
SEARCH SCORE THRESHOLD = 0.03

QUESTION ID: 0105 (BEFORE EDIT)
TOTAL NUMBER OF KEYWORDS = 100 (Seminar information × 1 + Workshop × 1 + Product overview × 1 + How to use × 1 + ...)
NUMBER OF SEARCH KEYWORDS INCLUDED IN TEXT TO BE SEARCHED = 2 (webinar × 1 + date and time × 1)
SEARCH SCORE = 0.02 (2/100)

QUESTION ID : 0105 (EDITED)
TOTAL NUMBER OF KEYWORDS = 103 (Seminar information × 1 + Workshop × 1 + Product overview × 1 + How to use × 1 + ...)
NUMBER OF SEARCH KEYWORDS INCLUDED IN TEXT TO BE SEARCHED = 5 (webinar × 4 + date and time × 1)
SEARCH SCORE = 0.049 (4/103)

INFORMATION PROCESSING APPARATUS, INFORMATION PROCESSING SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2021-118460, filed on Jul. 19, 2021, in the Japan Patent Office, the entire disclosure of which is hereby incorporated by reference herein.

BACKGROUND

Technical Field

Embodiments of this disclosure relate to an information processing apparatus, an information processing system, and an information processing method.

Related Art

In recent years, the use of services using, chatbot systems is beginning to grow for cost reduction and improvement of efficiency in guidance and inquiries about products and services. Improvement of accuracy of answers to questions is of importance for enhancing operation efficiency of systems using chatbots.

SUMMARY

An embodiment of the present disclosure includes an information processing apparatus including circuitry. The circuitry receives a question from one of a user terminal apparatus and an administrator terminal apparatus, the user terminal apparatus being operated by a user, the administrator terminal apparatus being operated by an administrator. The circuitry performs determination as to whether the received question is transmitted from the user terminal apparatus or transmitted from the administrator terminal apparatus. The circuitry searches for one or more answers including a word included in the question. The circuitry calculates a weighting of each of the one or more answers. In a case that a result of the determination indicates that the received question is transmitted from the user terminal apparatus, the circuitry transmits, among the one or more answers, an answer having a weighting satisfying, a predetermined threshold value of the weighting to the user terminal apparatus. In a case that the result of the determination indicates the received question is transmitted from the administrator terminal apparatus, the circuitry generates screen information of a screen for editing at least one of one or more answers at the administrator terminal apparatus.

An embodiment of the present disclosure includes an information processing method performed by an information processing apparatus. The method includes receiving a question from one of a user terminal apparatus and an administrator terminal apparatus, the user terminal apparatus being operated by a user, the administrator terminal apparatus being operated by an administrator. The method includes performing determination as to whether the received question is transmitted from the user terminal apparatus or transmitted from the administrator terminal apparatus. The method includes searching for one or more answers including a word included in the question. The method includes calculating a weighting of each of the one or more answers. The method includes, in a case that a result of the determination indicates that the received question is transmitted from the user terminal apparatus, transmitting, among the one or more answers, an answer having a weighting satisfying a predetermined threshold value of the weighting to the user terminal apparatus. The method includes, in a case that the result of the determination indicates the received question is transmitted from the administrator terminal apparatus, generate screen information of a screen for editing the at least one of the one or more answers, the screen being displayed on the administrator terminal apparatus.

An embodiment of the present disclosure includes an information processing system including an information processing apparatus, a user terminal apparatus, which is a terminal apparatus operated by a user, and an administrator terminal apparatus, which is a terminal apparatus operated by an administrator. The information processing apparatus includes first circuitry. The first circuitry receives a question from one of the user terminal apparatus and the administrator terminal apparatus. The first circuitry performs determination as to whether the received question is transmitted from the user terminal apparatus or transmitted from the administrator terminal apparatus. The first circuitry searches for one or more answers including a word included in the question. The first circuitry calculates a weighting of each of the one or more answers. In a case that a result of the determination indicates that the received question is transmitted from the user terminal apparatus, the first circuitry transmits, among the one or more answers, an answer having a weighting satisfying a predetermined threshold value of the weighting to the user terminal apparatus. In a case that the result of the determination indicates the received question is transmitted from the administrator terminal apparatus, the first circuitry generates screen information of a screen for editing the at least one of the one or more answers at the administrator terminal apparatus. The administrator terminal apparatus includes second circuitry. The second circuitry displays a screen for editing information relating to at least one of the one or more answers to the question on the administrator terminal apparatus. The second circuitry receives an operation of editing information relating to at least one the one or more answers to the question by the administrator.

BRIEF DESCRIPTION OF THE DRAWINGS

A more complete appreciation of the disclosure and many of the attendant advantages and features thereof can be readily Obtained and understood from the following detailed description with reference to the accompanying drawings, wherein:

FIG. 4 is a diagram illustrating an example of a question and answer database, according to an embodiment of the present disclosure;

FIG. 5 is a diagram illustrating an example of a conversation history database, according to an embodiment of the present disclosure;

FIG. 8 is a diagram illustrating an example of screen identification information, according to an embodiment of the present disclosure;

FIG. 9 is a diagram illustrating how to calculate a search score, according to an embodiment of the present disclosure;

FIG. 12A and FIG. 12B (FIG. 12) is a sequence diagram illustrating an example of operation of updating the question and answer database, according to an embodiment of the present disclosure;

FIG. 13 is a diagram illustrating an example of a conversation history list screen, according to an embodiment of the present disclosure;

FIG. 15 is a diagram illustrating an example of a question and answer edit screen, according to an embodiment of the present disclosure;

FIG. 17 is a diagram for describing improvement of accuracy of an answer resulting from editing question and answer information, according to an embodiment of the present disclosure.

Figure 1:
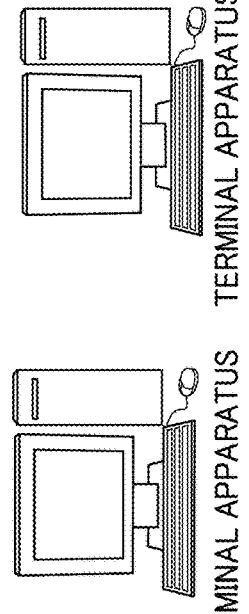
FIG. 1 is a schematic diagram illustrating an example of an information processing system, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate m a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the accompanying drawings, an information processing apparatus, an information processing system, and an information processing method are described, according to one or more embodiments of the present disclosure.

First Embodiment

System Configuration:

FIG. 1 is a schematic diagram illustrating an example of an information processing system 5 according to an embodiment of the present disclosure. The information processing system 5 includes a terminal apparatus 4, a terminal apparatus 3, and a server apparatus 1. The terminal apparatus 4 is for a user of a chatbot service. The terminal apparatus 4 is an example of a user terminal apparatus. The terminal apparatus 3 is for an administrator. The terminal apparatus 3 is an example of an administrator terminal apparatus. The server apparatus 1 provides the chatbot service.

The user operates a web browser of various types of apparatus including a laptop computer, a smartphone, and an image forming apparatus, each being the terminal apparatus 4 for a user, to access the server apparatus 1 through communication network 2 and use the chatbot service. Alternatively, the user may use the chatbot service by using an application that operates on the terminal apparatus 4 and has a chat capability.

The administrator operates a web browser of the terminal apparatus 3 for the administrator, to access the server apparatus 1 through the communication network 2 and perform management such as a check of a user's usage history (e.g., conversation history with at chatbot) and a check, change, and addition of a question and answer database.

The server apparatus 1 communicates with the terminal apparatus 3 for a user or the terminal apparatus 4 for an administrator, to transmit response message information to received message information. For example, the server apparatus 1 provides a service of providing an answer to a question from a user, a service of providing exchange of a message with a user, in other words, a chat. In the embodiment, the server apparatus 1 is implemented by one or more information processing apparatuses and provides, thorough the communication network 2, various types of services. Each service is provided by executing a series of processes in which one or more processes for implementing various types of functions are combined.

The illustration of FIG. 1 is one example of the configuration of the information processing system 5, and the information processing system 5 may have another suitable system configuration. The information processing system 5 according to the present embodiment includes various types of apparatuses each of which inputs electronic data or output electronic data and uses the various types of services provided by the server apparatus 1.

Figure 2:
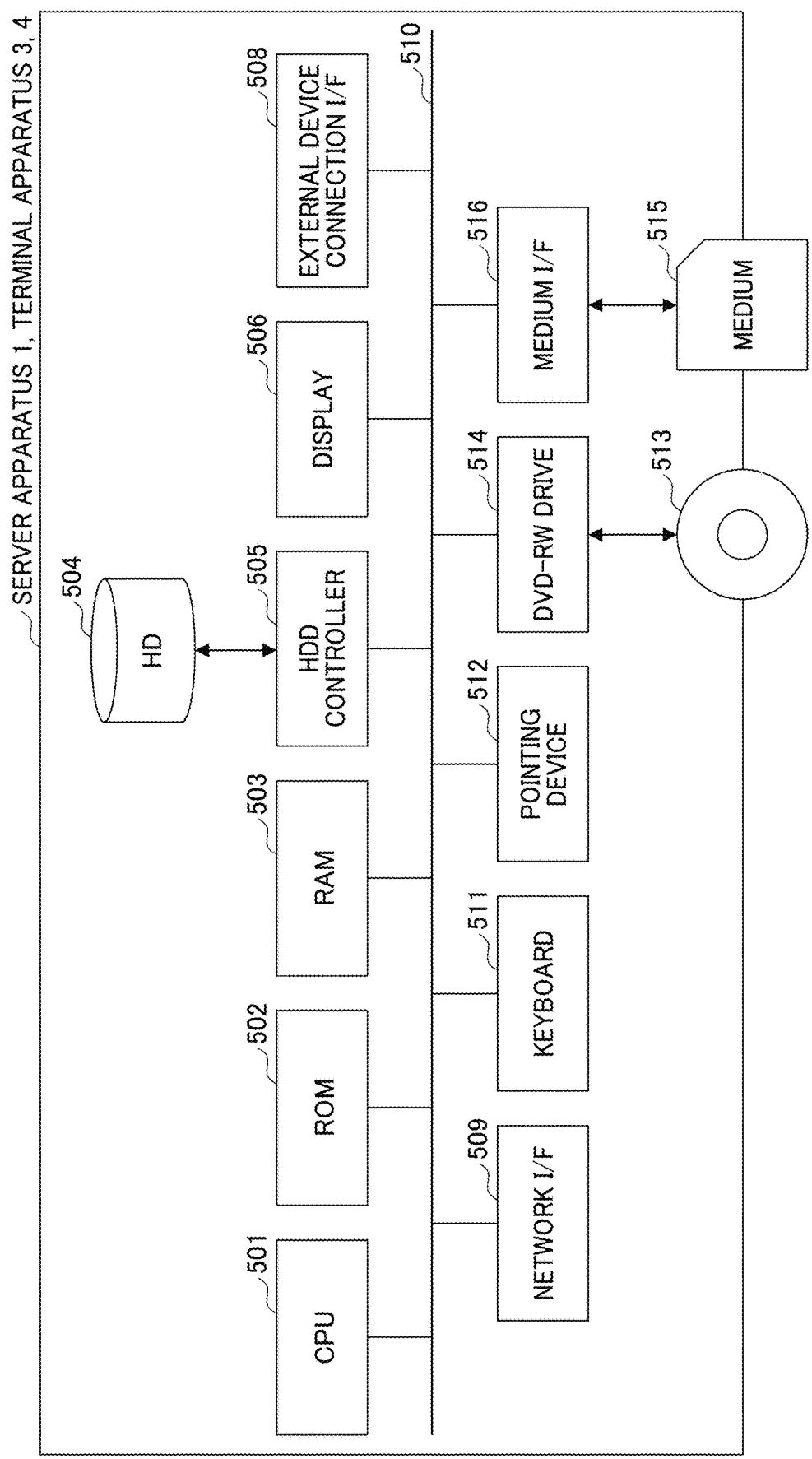
FIG. 2 is a block diagram illustrating an example of a hardware configuration of each of a server apparatus and a terminal apparatus, according to an embodiment of the present disclosure.

Hardware Configuration:

FIG. 2 is a block diagram illustrating an example of a hardware configuration of each of the server apparatus 1, the terminal apparatus 3, and the terminal apparatus 4, according to an embodiment of the present disclosure. As illustrated, in FIG. 2, each of the server apparatus 1, the terminal apparatus 3, and the terminal apparatus 4 is implemented by a computer. The computer includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disk rewritable (DVD-RW) drive 514, and a medium I/F 516.

The CPU 501 controls overall operation of the server apparatus 1, the terminal apparatus 3, and the terminal apparatus 4. The ROM 502 stores a program such as an initial program loader (IPL) to boot the CPU 501. The RAM 503 is used as a work area for the CPU 501. The HD 504 stores various data such as the program. The HDD controller 505 controls reading or writing of various data with respect to the HD 504 under control of the CPU 501. The display 506 displays various information such as a cursor, a menu, a window, characters, or an image. The external device connection I/F 508 is an interface that connects the computer to various external devices. Examples of the external devices include, but are not limited to, a universal serial bus (USB) memory and a printer. The network I/F 509 is an interface for performing data communication using the network N2. The bus line 510 is, for example, an address bus or a data bus, which electrically connects the components illustrated in FIG. 2, such as the CPU 501.

The keyboard 511 is an example of an input device including a plurality of keys used to input characters, numerals, or various instructions, for example. The pointing device 512 is an example of an input device that allows a user to select or execute various instructions, select an item to be processed, or move a cursor being displayed. The DVD-RW drive 514 controls reading or writing of various data with respect to a DVD-RW 513, which is an example of a removable storage medium. The DVD-RW is merely one example of the removable storage medium. In another example, the DVD-RW drive 514 controls reading or writing of data with respect to a digital versatile disk recordable (DVD-R). The medium I/F 516 controls reading or writing (storing) of data with respect to a storage medium 515 such as a flash memory.

Figure 3:
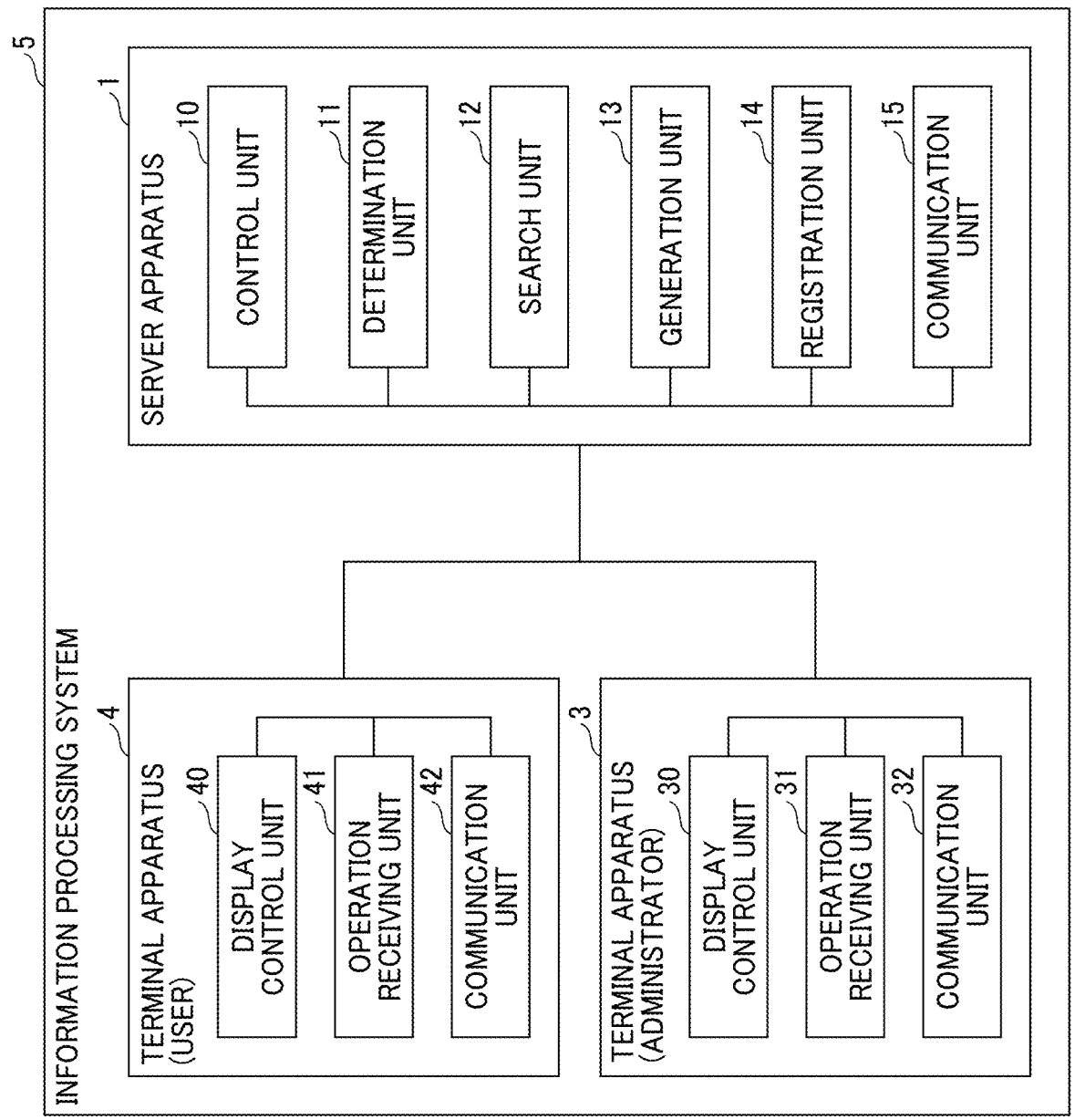
FIG. 3 is a block diagram illustrating an example of a functional configuration of the information processing system, according to an embodiment of the present disclosure.

Functions:

FIG. 3 is a block diagram illustrating an example of a functional configuration of the information processing system 5, according tux man embodiment of the present disclosure. The functional units described below are functions or means implemented by the CPU 501 executing instructions included in one or more programs installed on the server apparatus 1, the terminal apparatus 3, and the terminal apparatus 4, for example.

The server apparatus 1 includes a control unit 10, a determination unit 11, a search unit 12, a generation unit 13, a registration unit 14, and a communication unit 15.

The control unit 10 controls application for a conversation with a user via the terminal apparatus 4 of the user. The control unit 10 controls application that allows an administrator to perform a management operation such as editing of question and answer information via the terminal apparatus 3 of the administrator. Further, the control unit 10 controls each of functional units of the server apparatus 1 to perform processing.

The determination unit 11 determines whether a sender apparatus that has transmitted a search request for an answer to a question sentence to the server apparatus 1 is the terminal apparatus 4 of the user or the terminal apparatus 3 of the administrator.

The search unit 12 performs, for example, morphological analysis on the question sentence received from the terminal apparatus 4 of the user or the terminal apparatus 3 of the administrator to acquire a search keyword, and then searches a question and answer database 70 for the search keyword in text to be searched. Further, the search unit 12 calculates a search score, which is used for determining whether each of one or more retrieved answer sentences is appropriate as an answer to the question sentence. One or more answer sentences each having a search score higher than a predetermined threshold value are presented to the user. In the embodiments, the search score is used as an example of weighting, or counting. The predetermined threshold value is a value set by, for example, by the administrator or a designer in advance as desired, so that an answer having a search score that is equal to or greater than the predetermined threshold value is presented to the user as described below.

The generation unit 13 generates screen information of, for example, a conversation history list screen to be displayed on the terminal apparatus 3 of the administrator and screen information of a screen to be displayed on the terminal apparatus 3 of the user.

The registration unit 14 stores (saves) information such as the question and answer information and the conversation history in the question and answer database 70 and a conversation history database 80.

The communication unit 15 transmits and receives information to and from a communication unit 32 of the terminal apparatus 3 and a communication unit 42 of the terminal apparatus 4 through the communication network 2.

The terminal apparatus 3 used by the administrator includes a display control unit 30, an operation receiving unit 31, and the communication unit 32.

The display control unit 30 displays content based on the received screen information on a screen of the terminal apparatus 3. The operation receiving unit 31 receives operations such as character input and button pressing by the administrator. The communication unit 32 transmits and receives information to and from the communication unit 15 of the server apparatus 1 through the communication network 2.

The terminal apparatus 4 used by the user includes a display control unit 40, an operation receiving unit 41, and a communication unit 42.

The display control unit 40 displays content based on the received screen information on a screen of the terminal apparatus 4. The operation receiving unit 41 receives operations such as character input and button pressing by the user. The communication unit 42 transmits and receives information to and from the communication unit 15 of the server apparatus 1 through the communication network 2.

FIG. 4 is a diagram illustrating an example of the question and answer database 70, according to an embodiment of the present disclosure. The question and answer database 70 illustrated in FIG. 4 includes items of a question ID 71, an update date and time 72, a category 73, a question sentence 74, an alternative expression of the question 75, and an answer sentence 76. The question ID 71 is an ID as identification information uniquely identifying a question, using a symbol or a number. "ID" is an abbreviation for identification. The update date and time 72 is a date and time when question and answer information identified by the corresponding question ID is added or updated. The category 73 is information indicating a type of question and answer information. The question sentence 74 is a content of a question in question and answer information identified by the question ID. The alternative expression of the question 75 indicates a question having the same or substantially the same meaning as the question sentence 74 in a different manner. The alternative expression of the question 75 is used to present a more appropriate answer when an expression of a question from the user is different from the question sentence 74. The answer sentence 76 is a content of an answer in question and answer information identified by the question ID.

FIG. 5 is a diagram illustrating an example of the conversation history database 80, according to an embodiment of the present disclosure. The conversation history database 80 illustrated in FIG. 5 includes items of a conversation ID 81, a conversation date and time 82, the category 73, the question ID 71, the question sentence 74, and the answer sentence 76. The conversation ID 81 is an ID uniquely identifying a conversation with a symbol or a number. The conversation date and time 82 is a date and time when a conversation is recorded in the conversation history database 80. The descriptions given above of the category 73, the question ID 71, the question sentence 74, and the answer sentence 76 with reference to FIG. 4 apply to those in the question and answer database 70.

Figure 6:
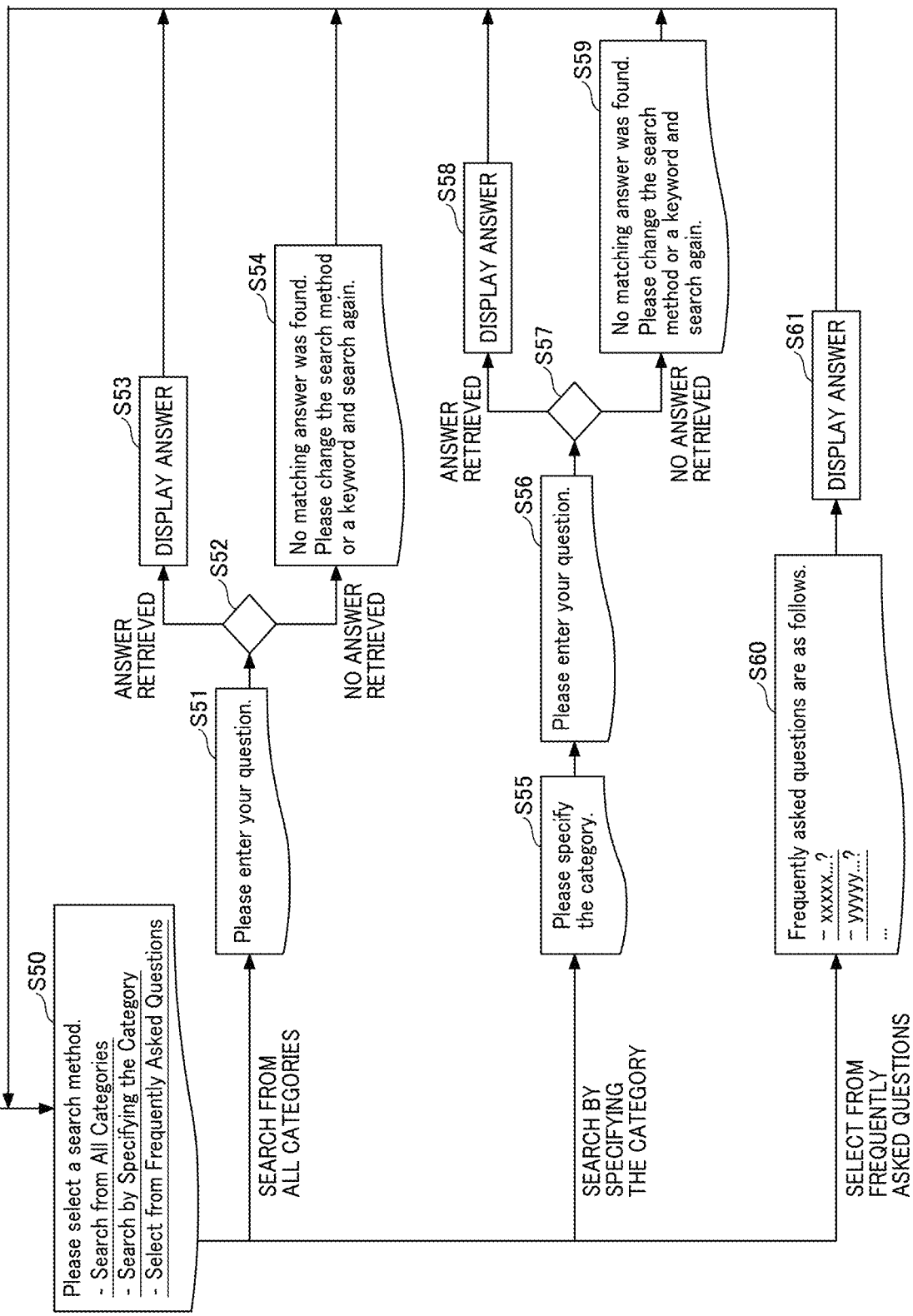
FIG. 6 is a diagram illustrating an example of scenario information stored in a conversation scenario database, according to an embodiment of the present disclosure.

Details of Scenario Information:

A description is now given of details of scenario information illustrated in FIG. 6. FIG. 6 is a diagram illustrating an example of scenario information stored in the conversation scenario database 90, according to an embodiment of the present disclosure. The control unit 10 of the server apparatus 1 controls a conversation application based on scenario information illustrated in FIG. 6 for a conversation with a user via the terminal apparatus 4 of the user. Each of the functional units other than the control unit 10 performs processing in accordance with instructions from the control unit. However, in the following description given with reference to FIG. 6, descriptions of processing performed by the other functional units are omitted, because the following description aims to describe the scenario information stored in the conversation scenario database 90.

Step S50: The control unit 10 controls the terminal apparatus 4 to display a selection menu of a question search method. For example, the selection menu includes three options, i.e., "Search from all categories", "Search by specifying the category", and "Select from frequently asked questions". In another example, the selection menu ma include four or more options or two or less options.

Step S51: When "Search from all categories" is selected, the control unit 10 controls the terminal apparatus 4 to display a message "Please enter your question" that prompts the user to enter a question.

Step S52: The control unit 10 searches the question and answer database 70 for an answer corresponding to the question input by the user.

Step S53: When the search result indicates that an answer corresponding to the question is stored in the question and answer database 70, the control unit 10 controls the terminal apparatus 4 to display the corresponding answer. Then, the operation returns to step S50.

Step S54: When the search result indicates that no answer corresponding to the question is stored in the question and answer database 70, the control unit 10 controls the terminal apparatus 4 to display a message that prompts the user to perform the search again with different conditions. For example, a message "No matching answer was found. Please chance the search method or a keyword and search again." is displayed. Then, the operation returns to step S50.

Step S55: When "Search by specifying the category" is selected, the control unit 10 controls the terminal apparatus 4 to display a message "Please specify the category" that prompts the user to specify his/her desired category.

Step S56: Next, the control unit 10 controls the terminal apparatus 4 to display a message "Please enter your question" that prompts the user to enter a question.

Step S57: The control unit 10 searches the question and answer database 70 for an answer corresponding to the question input by the user in the category specified by the user.

Step S58: When the search result indicates that an answer corresponding to the question is stored in the question and answer database 70, the control unit 10 controls the to apparatus 4 to display the corresponding answer. Then, the operation returns to step S50.

Step S59: When the search result indicates that no answer corresponding to the question is stored in the question and answer database 70, the control unit 10 controls the terminal apparatus 4 to display a message that prompts the user to perform the search again with different conditions. For example, a message "No matching answer was found. Please change the search method or a keyword and search again," is displayed. Then, the operation returns to step S50.

Step S60: When "Select from frequently asked questions" is selected, the control unit 10 controls the terminal apparatus 4 to display questions that was asked many times in the past.

Step S61: The control unit 10 controls the terminal apparatus 4 to display an answer to a question selected by the user. Then, the operation returns to step S50.

Figure 7:
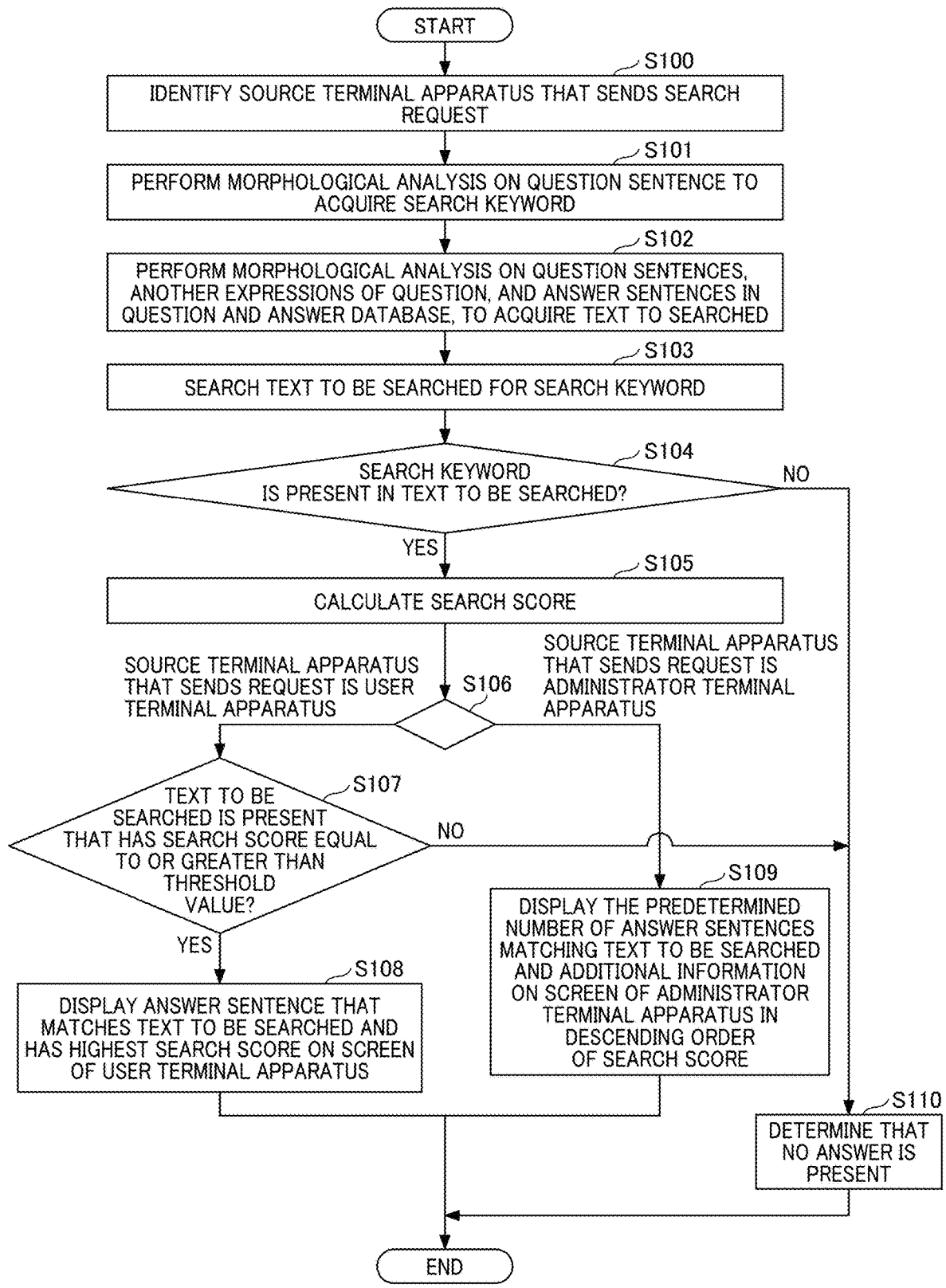
FIG. 7 is a flowchart illustrating an example of operation of presenting an answer to a question input by a user and an administrator, according to an embodiment of the present disclosure.

Operation of Presenting Search Result of Answer to Question:

FIG. 7 is a flowchart illustrating an example of operation of presenting an answer to a question input by a user and an administrator, according to an embodiment of the present disclosure. Each of the steps in the operation is described below.

Step S100: The determination unit 11 of the server apparatus 1 determines whether a sender apparatus that has transmitted a search request for an answer to a question sentence to the server apparatus 1 is the terminal apparatus 4 used by the user or the terminal apparatus 3 used by the administrator. The determination is performed by the following two types of methods including a first determination method and a second determination method.

In the first determination method, different application programming interfaces (APIs) for executing the search request are prepared respectively for the terminal apparatus 4 of the user and the terminal apparatus 3 of the administrator. For example, the APIs includes a first API and a second API. Thus, the server apparatus 1 determines whether the request is from the terminal apparatus 4 of the user or from the terminal apparatus 3 of the administrator based on the type of the executed API.

In the second determination method, a request message transmitted by the terminal apparatus 4 of the user and the terminal apparatus 3 of the administrator to the server apparatus 1 includes screen identification information for identifying a screen when the request is sent. FIG. 8 is a diagram illustrating an example of the screen identification information, according to an embodiment of the present disclosure. As illustrated in FIG. 8, screen identification information 202 is set for screen names 201 of screens operated by the user and the administrator as information for distinguishing two types of screens from one another, the two types of screen being a user screen and an administrator screen indicated by screen types 200. The terminal apparatus 4 of the user and the terminal apparatus 3 of the administrator include the screen identification information 202 in the request message to be transmitted to the server apparatus 1. Thus, the server apparatus 1 checks the screen identification information 202 included in the received request message, to determine whether the request sender is the terminal apparatus 4 of the user or the terminal apparatus 3 of the administrator.

Referring again to FIG. 7, subsequent steps of the operation are described.

Step S101: The search unit 12 of the server apparatus removes a part of speech such as a particle from the result of morphological analysis on the question sentence received from the terminal apparatus 4 of the user or the terminal apparatus 3 of the administrator, to obtain one or more search keywords.

Step S102: The search unit 12 of the server apparatus 1 performs morphological analysis on the question sentence 74, the alternative expression of the question 75, and the answer sentence 76 in the question and answer database 70, to obtain a set of words as text to be searched for each question ED 71. Alternatively, text to be searched obtained by performing morphological analysis in advance and stored in the question and answer database 70 may be used.

Step S103: The search unit 12 of the server apparatus 1 searches the text to be searched for the search keyword.

Step S104: When the text to be searched includes at least one search keyword (S104: YES), the control unit 10 of the server apparatus 1 advances the operation to step S105. By contrast, when the text to be searched includes no search keyword (S104: NO), the control unit 10 advances the operation to step S110.

Step S105: The search unit 12 of the server apparatus 1 calculates a search score of the text to be searched including the search keyword for each question ID 71. A detailed description is given later of how to calculate the search score.

Step S106: When the sender apparatus of the search request determined by the determination unit 11 in step S100 is the terminal apparatus 4 of the user, the control unit 10 of the server apparatus 1 advances the operation to step S107. By contrast, when the sender apparatus of the search request source is the terminal apparatus 3 of the administrator, the control unit 10 advances the operation to step S109.

Step S107: When the search scores of the text to be searched calculated in step S105 includes a search score equal to or greater than a predetermined threshold value (S107: YES), the control unit 10 of the server apparatus 1 advances the operation to step S108. By contrast, when none of the search scores of the text to be searched calculated in step S105 is equal to or greater than the predetermined threshold value (S107: NO), the control unit 10 advances the operation to step S110. In other words, an answer to the user is selected so that an answer having a search score that is equal to or greater than the predetermined threshold value is presented and an answer having a search score that is lower than the predetermined threshold value is not presented to the user.

Step S108: The communication unit 15 of the server apparatus 1 transmits the answer sentence 76 associated with the question ID 71 corresponding to the text to be searched having the highest search score to the communication unit 42 of the terminal apparatus 4. The display control unit 40 of the terminal apparatus 4 displays the answer sentence 76 received from the server apparatus on a screen of the terminal apparatus 4.

Step S109: The communication unit 15 of the server apparatus 1 transmits answer sentences 76 associated with question IDs 71 corresponding to the text to be searched including the search keyword to the communication unit 33 of the terminal apparatus 3 of the administrator. Further, the communication unit 15 transmits, as additional information, the category 73, the question sentence 74, the alternative expression of the question 75, a satisfaction level, the number of answers, and the search score to the communication unit 33. The display control unit 30 of the terminal apparatus 3 displays a predetermined number of the received answer sentences 76 and the additional information on the screen of the terminal apparatus 3 in descending order of the search score. The selection based on the threshold value as performed in step S107 is performed for the answers to be presented to the administrator, because answers whose contents are to be improved are also to be displayed. However, displaying too large number of answers is inconvenient in view of management. To address such an issue, the number of answers to be displayed may be limited to the designated number in descending order of the search score. In the embodiment, the satisfaction level is a value obtained by summing up satisfaction levels responded by of users with respect to the answer sentence 76. For example, the satisfaction level is a ratio (%) of users who answered "satisfied" with respect to a result of users answering "satisfied" or "unsatisfied" with respect to the answer sentence 76. In other words, if the number of users who answered that they are satisfied is A and the number of users who answered that they are dissatisfied is B, the degree of satisfaction is $\{A/(A+B)\}\times 100(\%)$. The number of answers is the number of times that, the answer sentence 76 is presented to the users. In another example, the server apparatus 1 may transmit screen information in which the answer sentence 76 and ale additional information are arranged side by side in descending order of the search score to the terminal apparatus 3, and the terminal apparatus 3 may display the received screen information as it is. In this example, the search score may not be included in the additional information. In still another example, the server apparatus 1 may include the search score in the additional information and transmit the additional information including the search score to the terminal apparatus 3. In this example, the terminal apparatus 3 rearranges the answer sentences 76 and the additional information in descending order of the search score and displays the rearranged the answer sentences 76 and the additional information.

Step S110: Because there is no answer to be presented, the communication unit 15 of the server apparatus 1 transmits, for example, a message "No matching answer was found, Please change the search method or a keyword and search again." to the terminal apparatus 3 or the terminal apparatus 4.

How to Calculate Search Score:

FIG. 9 is a diagram illustrating how to calculate a search score, according to an embodiment of the present disclosure. First, it is assumed that the search keywords acquired in step S101 of FIG. 7 are "seminar" and "date and time". Further, it is assumed that the text to be searched acquired in step S102 are the question sentence 74, the alternative expression of the question 75, and the answer sentence 76 in the question and answer database 70, and the question IDs associated with the text to be searched including the search keyword are "0105" and "0110". A calculation formula for the search score is expressed by Search score=C/D, where C is the number of search keywords included in the text to be searched, and D is a total number of keywords included in the text to be searched. For the text to be searched associated with the question ID "0105", the total number of keywords is 100 and the number of search keywords included in the text to be searched is 5. Thus, the search score is 0.05 (5/100). Further, for the text to be searched associated with the question ID "0110", the total number of keywords is 200 and the number of search keywords included in the text to be searched is 2. Thus, the search score is 0.01 (2/200).

Assuming that the threshold value for the search score in step S107 is 0.03, the answer sentence 76 associated with the question ID "0105" whose search score is higher than the threshold value and highest is displayed on a screen of the terminal apparatus 4 of the user in step S108. Further, assuming that the predetermined number of answer sentences in step S109 is 10, the answer sentence 76 associated with the question ID "0105" and the corresponding additional information are first displayed, and then the answer sentence 76 associated with the question ID "0110" and the corresponding additional information are displayed on a screen of the terminal apparatus 3 of the administrator.

Figure 10:
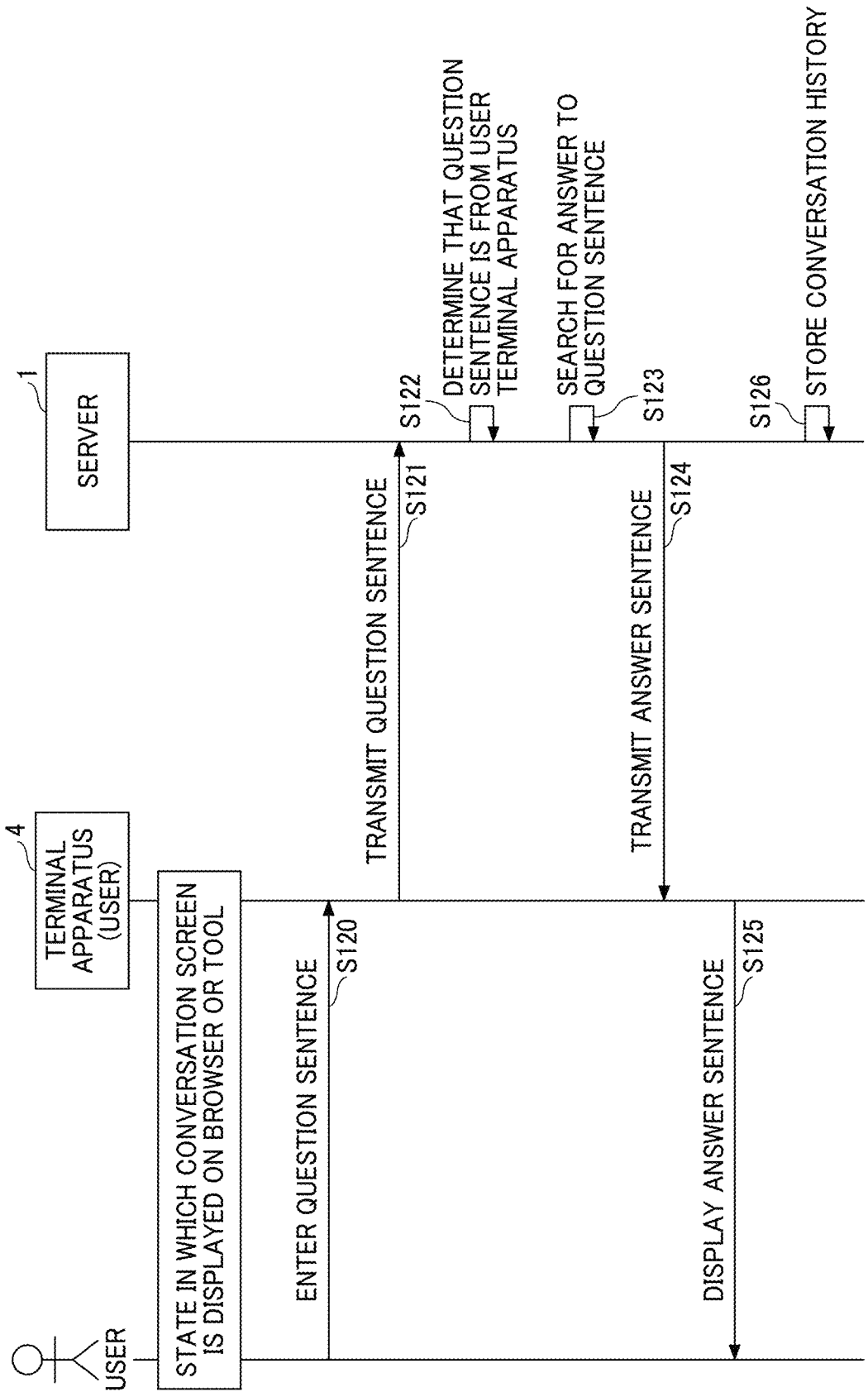
FIG. 10 is a sequence diagram illustrating an example of operation of presenting an answer to a user's question, according to an embodiment of the present disclosure.

Operation of Presenting Answer to User FIG. 10 is a sequence diagram illustrating an example of an operation of presenting an answer to a user's question, according to an embodiment of the present disclosure. Each of the steps in the operation is described below.

Step S120: The operation receiving unit 41 of the terminal apparatus 4 receives an input of a question sentence from a user.

Step S121: The communication unit 42 of the terminal apparatus 4 transmits the input question sentence to the communication unit 15 of the server apparatus 1.

Step S122: The determination unit 11 of the server apparatus 1 determines that the question sentence is received from the terminal apparatus 4 of the user. The determination in the step S122 is perfumed as described above with reference to step S100 of FIG. 7.

Step S123: The search unit 12 of the server apparatus 1 searches for an answer sentence to the received question sentence. The search in the step S123 is performed as described above with reference to steps S101 to 107 in FIG. 7.

Step S124: The communication unit 15 of the server apparatus 1 transmits the retrieved answer sentence to the communication unit 42 of the terminal apparatus 4.

Step S125: The display control unit 40 of the terminal apparatus 4 displays the received answer sentence on the screen of the terminal apparatus 4.

Step S126: The registration unit 14 of the server apparatus 1 stores a conversation history in the conversation history database 80.

Figure 11:
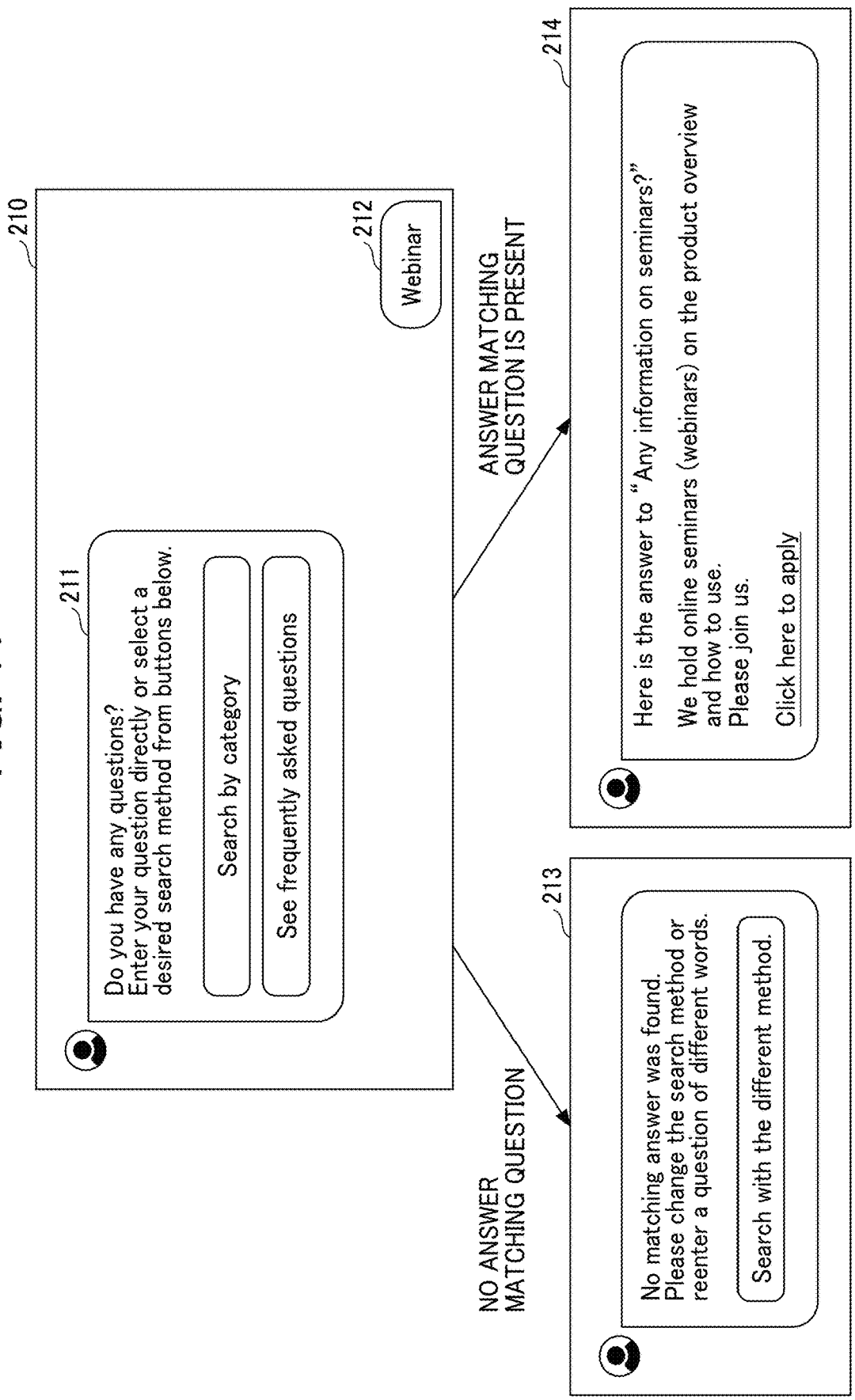
FIG. 11 is a diagram illustrating an example of a conversation screen displaying an answer to a question from a user, according to an embodiment of the present disclosure.

FIG. 11 is a diagram illustrating an example of a conversation screen displaying an answer to a question from a user, according to an embodiment of the present disclosure. On a conversation screen 210 displayed on the screen of the terminal apparatus 4 used by a user illustrated in FIG. 11, a "webinar", which is a question sentence 212 from the user, is displayed below a message 211 transmitted by the server apparatus 1. When no answer sentence to the question is retrieved as a result of the search process in step S123 of FIG. 10, a message indicating that no matching answer was found is displayed in an answer sentence 213. By contrast, when an answer sentence to the question is retrieved, a message in an answer sentence 214 is displayed.

Figure 12B:
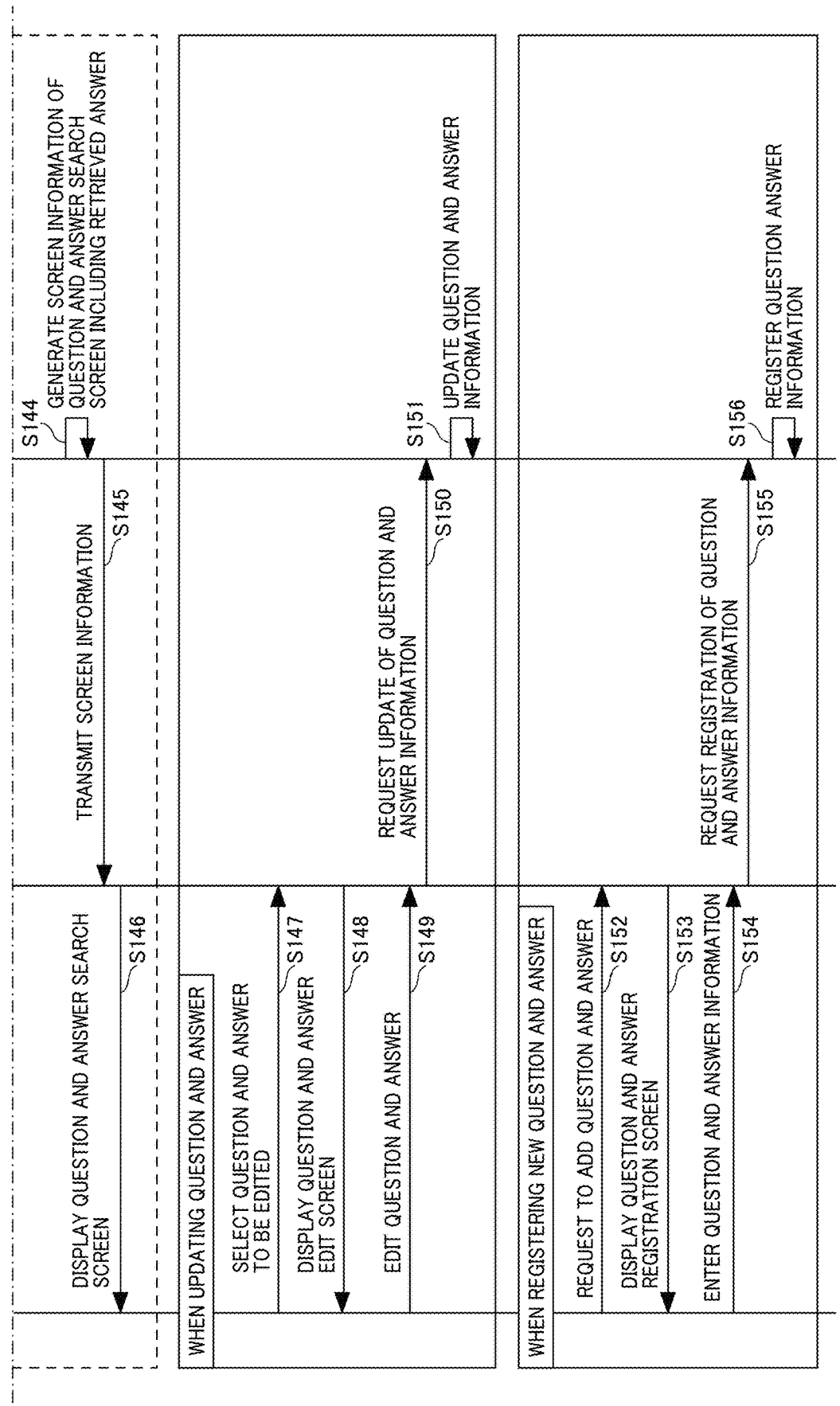

Operation of Updating Question and Answer Database:

FIG. 12 (FIG. 12A and FIG. 12B) is a sequence diagram illustrating an example of an operation of updating the question and answer database 70, according to an embodiment of the present disclosure. In the operation illustrated in FIG. 12 (FIG. 12A and FIG. 12B), the server apparatus 1 transmits an edit screen that allows the administrator to edit or add question and answer information to the terminal apparatus 3 to improve the answer accuracy. Each of the steps in the operation is described below.

Step S130: The operation receiving unit 31 of the terminal apparatus 3 receives an operation for requesting the conversation history list screen from the administrator.

Step S131: The communication unit 32 of the terminal apparatus 3 transmits a request message for the conversation history list screen to the communication unit 15 of the server apparatus 1.

Step S132: The generation unit 13 of the server apparatus 1 generates screen information of the conversation history list screen based on information stored in the conversation history database 80.

Step S133: The communication unit 15 of the server apparatus 1 transmits the screen information of the conversation history list screen to the communication unit 32 of the terminal apparatus 3.

Step S134: The display control unit 30 of the terminal apparatus 3 displays the conversation history list screen on the screen of the terminal apparatus 3. FIG. 13 is a diagram illustrating an example of the conversation history list screen, according to an embodiment of the present disclosure. On a conversation history list screen 220 illustrated in FIG. 13, a period designation button 221 and a category designation button 222 are displayed. The administrator presses the period designation button 221 to designate a desired period of the conversation history to be displayed. Further, the administrator presses the category designation button 222 to designate a desired category of the conversation history to be displayed. Further, on the conversation history list screen 220, a date and time 223, a category 224, a chat ID 225, an answer by chatbot 226, an input of questioner 227, and an evaluation 228 are displayed as items in each conversation history. Further, the administrator presses a search request button 229 displayed in each conversation history, to request a search for an answer to the question sentence described in the input of questioner 227.

Referring again to FIG. 12 (FIG. 12A and FIG. 12B), a further description is given.

Step S135: The operation receiving unit 31 of the terminal apparatus 3 receives an operation of selecting a conversation history to be improved from the administrator. This operation is performed by pressing the search request button 229 illustrated in FIG. 13.

Step S136: The communication unit 32 of the terminal apparatus 3 transmits a message requesting a question and answer search result screen corresponding to the selected conversation history to the communication unit 15 of the server apparatus 1.

Step S137: The search unit 12 of the server apparatus 1 searches for an answer sentence to the question sentence in the selected conversation history. The search in the step S137 is performed as described above with reference to steps S101 to 103 in FIG. 7.

Step S138: The generation unit 13 of the server apparatus 1 generates screen information of the question and answer search result screen for displaying question and answer information including the retrieved answer sentence.

Step S139: The communication unit 15 of the server apparatus 1 transmits the screen information of the question and answer search result screen to the communication unit 32 of the terminal apparatus 3.

Figure 14:
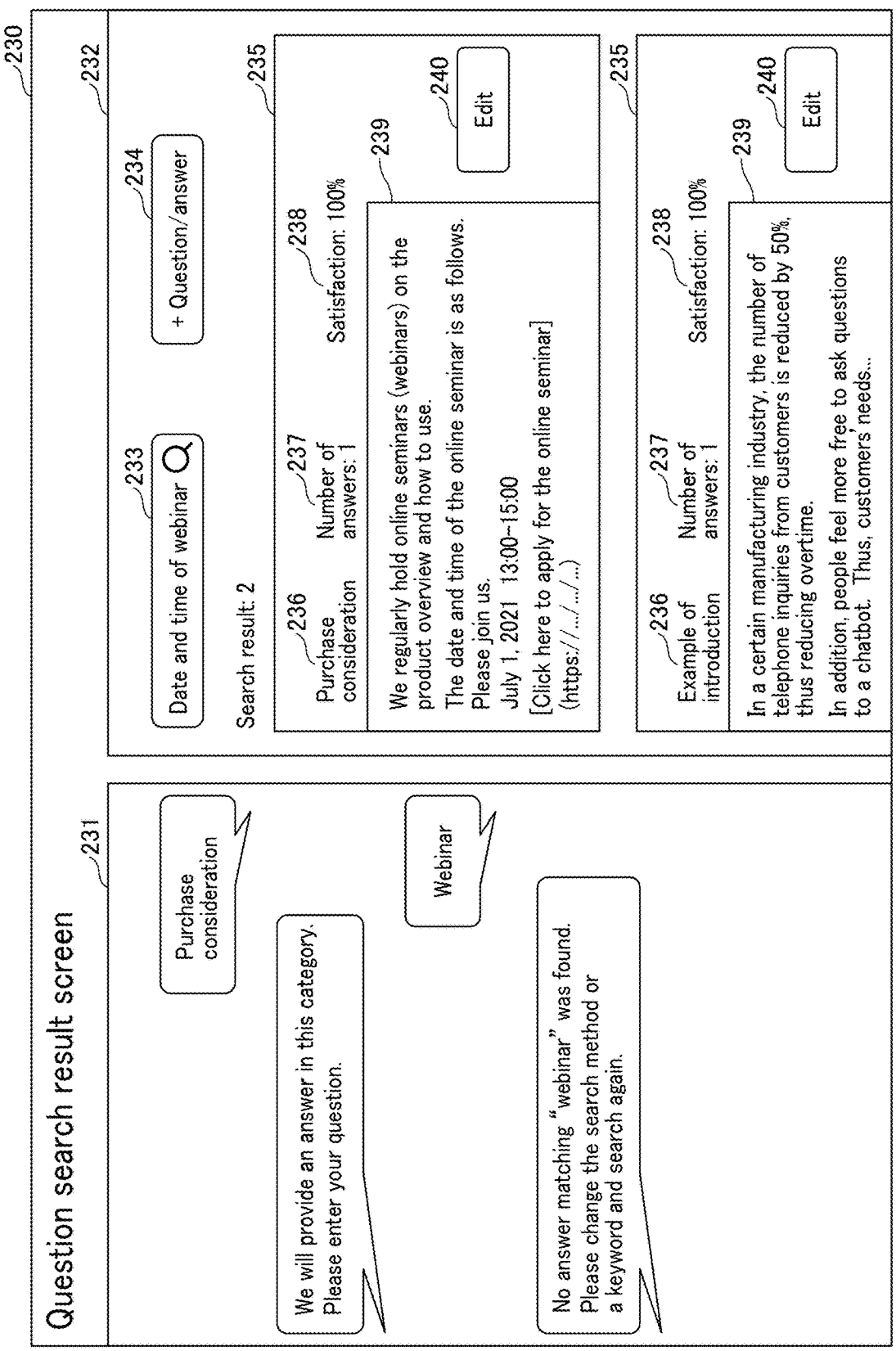
FIG. 14 is a diagram illustrating an example of a question and answer search result screen, according to an embodiment of the present disclosure.

Step S140: The display control unit 30 of the terminal apparatus 3 displays the question and answer search result screen on the screen of the terminal apparatus 3. FIG. 14 is a diagram illustrating an example of the question and answer search result screen, according to an embodiment of the present disclosure. On the question and answer search result screen 230 illustrated in FIG. 14, a conversation screen 231 corresponding to the conversation history for which execution of the search is requested in step S135 and an answer sentence search result screen 232 are displayed. Two search results 235 are displayed on the answer sentence search result screen 232. Further, in each of the search results 235, and a category 236, the number of answers 237, a satisfaction level 238, and an answer sentence 239 are displayed as additional information. Furthermore, in each of the search results 235, an edit execution button 240 for starting to edit the question and answer information is displayed. Furthermore, in the answer sentence search result screen 232, an entry field 233 is displayed in which the administrator enters a corrected question sentence to perform the question and answer search again. Furthermore, in the answer sentence search result screen, a question and answer addition button 234 is displayed, which, in response to pressing by the administrator, allows the administrator to newly add a question and answer.

Referring again to FIG. 12 (FIG. 12A and FIG. 12B), a further description is given.

Step S141: The administrator corrects the question sentence of the selected conversation history as needed. The operation receiving unit 31 of the terminal apparatus 3 receives an operation for requesting the question and answer search result screen based on the question sentence corrected by the administrator.

Step S142: The communication unit 32 of the terminal apparatus 3 transmits a message requesting the question and answer search result screen corresponding to the corrected question sentence to the communication unit 15 of the server apparatus 1.

Step S143: The search unit 12 of the server apparatus 1 searches for an answer sentence to the corrected question sentence. The search in the step S143 is performed as described above with reference to steps S101 to 103 in FIG. 7.

Step S144: The generation unit 13 of the server apparatus 1 generates screen information of the question and answer search result screen for displaying question and answer information including the retrieved answer sentence.

Step S145: The communication unit 15 of the server apparatus 1 transmits the screen information of the question and answer search result screen to the communication unit 32 of the terminal apparatus 3.

Step S146: The display control unit 30 of the terminal apparatus 3 displays the question and answer search result screen 230 illustrated in FIG. 14 based on the corrected question sentence on the screen of the terminal apparatus 3.

Step S147: To update contents of a question and answer, the administrator presses the edit execution button 240 corresponding to a question and answer to be edited on the question and answer search result screen 230 illustrated in FIG. 14. The operation receiving unit 31 of the terminal apparatus 3 receives an operation of pressing the edit execution button 240 by the administrator.

Step S148: The display control unit 30 of the terminal apparatus 3 displays a question and answer edit screen for editing the selected question and answer an the screen of the terminal apparatus 3. Since the information of the question and answer to be displayed in step S148 is included in the screen information of the question and answer search result screen received in step S145, the terminal apparatus 3 does not have to request the server apparatus 1 for information for displaying the question and answer edit screen. FIG. 15 is a diagram illustrating an example of the question and answer edit screen, according to an embodiment of the present disclosure. On a question and answer edit screen 250 illustrated in FIG. 15, a category selection button 251, a question entry field 252, an answer entry field 253, an alternative expression of the question entry field 254, and a save button 255 are displayed. The category selection button 251 allows the administrator to change the category. The administrator can edit the question that has been input in the question entry field 252. The administrator can edit the answer that has been input in the answer entry field 253. Further, the administrator can edit an alternative expression of the question that has been input in the alternative expression of the question entry field 254. Furthermore, the administrator can add a new alternative expression of the question and delete an existing alternative expression of the question. After performing the above editing operations, the administrator can save the contents of the edited question and answer by pressing the save button 255. In the example of FIG. 15, the contents added by the editing operation are the two underlined text "(webinar)" in the answer entry field 253 and "Any information on webinars?" added in the alternative expression of the question entry field 254.

Referring again to FIG. 12 (FIG. 12A and FIG. 12B), a further description is given.

Step S149: The operation receiving unit 31 of the terminal apparatus 3 receives an editing operation to the question and answer by the administrator.

Step S150: The communication unit 32 of the terminal apparatus 3 transmits a message requesting an update of the question and answer information to the communication unit 15 of the server apparatus 1.

Step S151: The registration unit 14 of the server apparatus 1 stores the updated question and answer information in the question and answer database 70.

Step S152: To add a new question and answer, the administrator presses the question and answer addition button 234 on the question and answer search result screen 230 illustrated in FIG. 14. The operation receiving unit 31 of the terminal apparatus 3 receives the operation of pressing the question and answer addition button 234 by the administrator.

Figure 16:
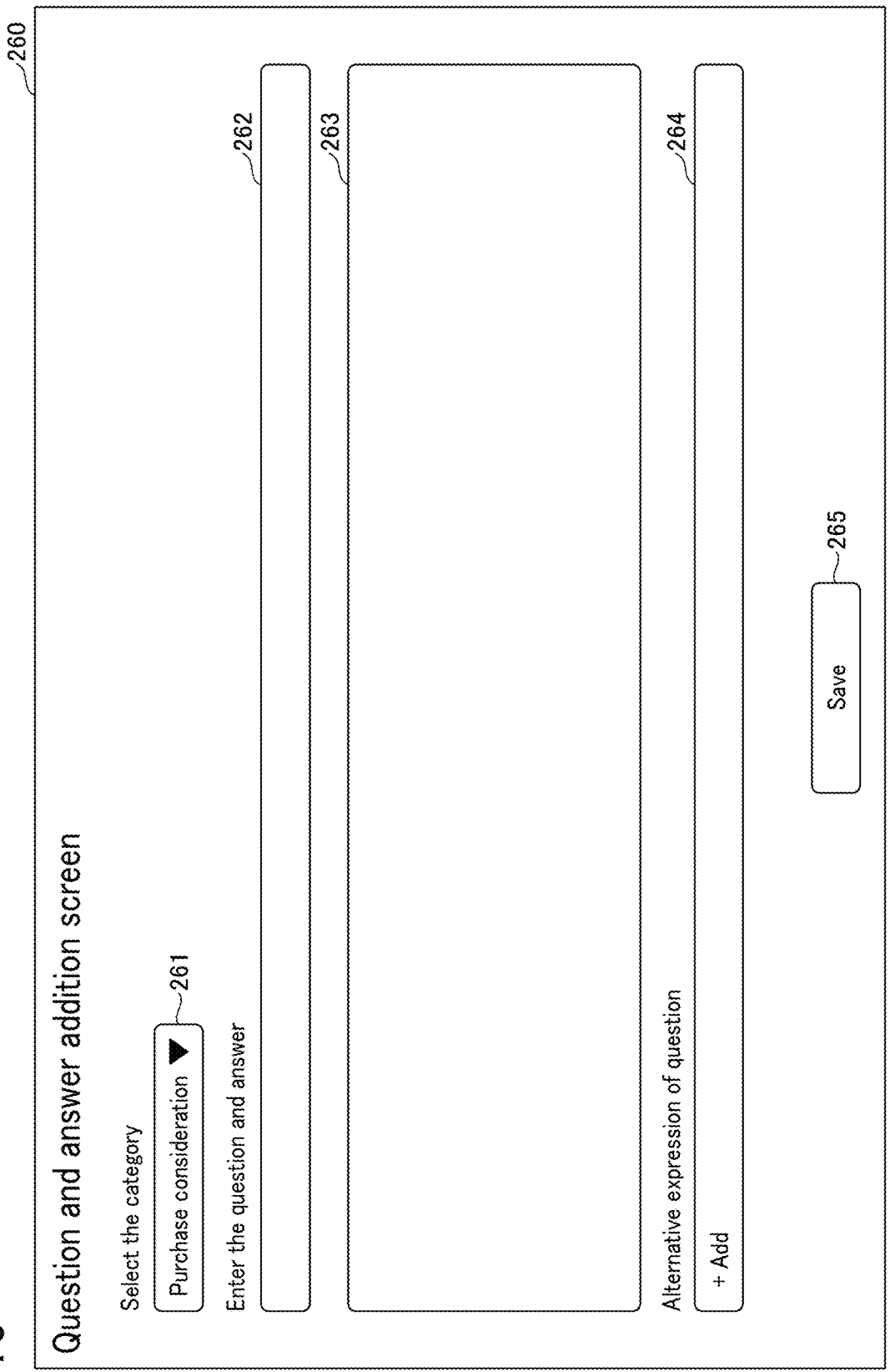
FIG. 16 is a diagram illustrating an example of a question and answer addition screen, according to an embodiment of the present disclosure.

Step S153: The display control unit 30 of the terminal apparatus 3 displays a question and answer addition screen for adding a question and answer on the screen of the terminal apparatus 3. FIG. 16 is a diagram illustrating an example of the question and answer addition screen, according to an embodiment of the present disclosure. On a question and answer addition screen 260 illustrated in FIG. 16, a category selection button 261, a question entry field 262, an answer entry field 263, an alternative expression of the question entry field 264, and a save button 265 are displayed. The category selection button 261 allows the administrator to change the category. The administrator can enter a question in the question entry field 262. The administrator can enter an answer in the answer entry field 263. Further, the administrator can add an alternative expression of the question in the alternative expression of the question entry field 264. After performing the above input operations, the administrator can save the contents of the entered question and answer by pressing the save button 265.

Referring again to FIG. 12 (FIG. 12A and FIG. 12B), a further description is given.

Step S154: The operation receiving unit 31 of the terminal apparatus 3 receives the operation of entering the question and answer and the operation of pressing the save button 265 by the administrator on the question and answer addition screen 260 illustrated in FIG. 16.

Step S155: The communication unit 32 of the terminal apparatus 3 transmits a message requesting an addition of the question and answer information to the communication unit 15 of the server apparatus 1.

Step S156: The registration unit 14 of the server apparatus stores the added question, and answer information in the question and answer database 70.

Improvement of Accuracy of Answer Resulting from Edit of Question and Answer Information:

FIG. 17 is a diagram for describing improvement of the accuracy of an answer resulting from editing the question and answer information, according to an embodiment of the present disclosure. Before the operation of editing the question and answer information described above with reference to FIG. 12 (FIG. 12A and FIG. 12B), the search score of the answer corresponding to the question ID "0105" is 0.02 (2/100), as the total number of keywords is 100 and the number of search keywords included in the text to be searched is 2. In the embodiment, since the threshold value of the search score is 0.03 and the search score is lower than the threshold value, the answer corresponding to the question ID "0105" is not presented to the user. However, as illustrated in FIG. 9, in a case that the search keywords are "seminar" and "date and time", the search score is 0.05, which exceeds the threshold value (0.03), and thus the answer is presented to the user. Since "(online) seminar" and "webinar" have substantially the same meaning, the answer should be presented to the user also for the case where the search keywords are "webinar" and "date and time". In view of such an issue, through the operation of editing the question and answer information as described above with reference to FIG. 12 (FIG. 12A and FIG. 12B), the word "webinar" is added at three positions (two in the answer and one in the alternative expression of the question) in a manner that "seminar" and "webinar" are used together. As a result, as illustrated in FIG. 17, after the editing operation, the total number of keywords is 103, and the number of search keywords included in text to be searched is 5. Thus, the search score is 0.049 (4/103). Since the search score exceeds the threshold value (0.03), an answer is presented to the user. Thus, improvement is achieved.

Further, in the question and answer search result displayed on the terminal apparatus 3 of the administrator, an answer whose search score is lower than the threshold value is displayed. With this configuration, the administrator searches for an answer to be edited for improvement and designates corresponding answer in a simple manner. For example, in a case that the search keyword is "webinar", the answer associated with the question ID "0105" is not presented to a user because the search score is lower than the thresholds. However, the answer is displayed on the question and answer search result screen 230 on the screen of the terminal apparatus 3 used by the administrator (FIG. 14).

Figure 18:
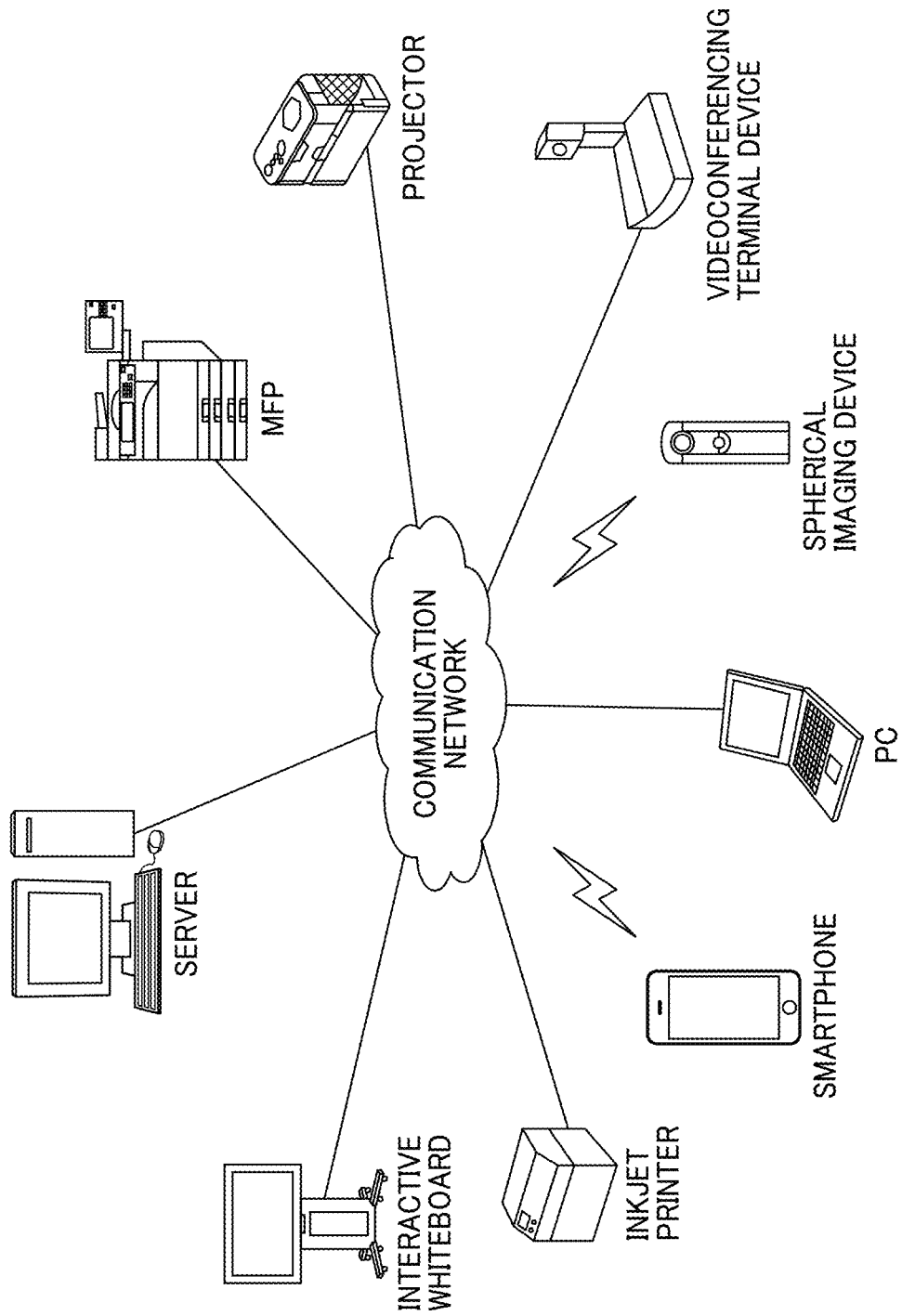
FIG. 18 is a diagram illustrating examples of the terminal apparatus used by a user, according to an embodiment of the present disclosure.

FIG. 18 is a diagram illustrating examples of the terminal apparatus 4 used by a user, according to an embodiment of the present disclosure. As illustrated in FIG. 18, a user can use the chatbot service according to the embodiment of the present disclosure through a browser or a display of various devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functional configuration of the information processing system 5 are divided into the functional blocks as illustrated in FIG. 3, for example, based on main functions of the information processing system, in order to facilitate understanding the processes performed by the information processing system. No limitation is intended by how the functions are divided by process or by the name of the functions. The processes implemented by the information processing system 5 can be divided to a larger number of processes depending on the contents of processes. Further, one process may be divided to include the larger number of processes.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses, devices, and the like described are merely an illustration of one of several computing environments for implementing the embodiments disclosed herein. In some embodiments, the information processing system 5 includes multiple computing devices, such as a server cluster. The multiple computing devices communicate with one another through any type of communication link including, for example, a network or a shared memory, and performs the operations described in the present disclosure.

There are no related arts that provide an edit screen that allows an administrator to improve the accuracy of answers to questions.

According to one or more embodiments of the present disclosure, an edit screen is presented that allows an administrator to improve the accuracy of answers to questions.

The invention claimed is:

1. An information processing apparatus comprising circuitry configured to:
  receive a question from one of a user terminal and an administrator terminal, the user terminal being operated by a user, the administrator terminal being operated by an administrator;
  perform determination as to whether the received question is transmitted from the user terminal or transmitted from the administrator terminal;
  search for one or more answers including a word included in the question;
  calculate a weighting of each of the one or more answers;
  in a case that a result of the determination indicates that the received question is transmitted from the user terminal, transmit an answer of the one or more answers to the user terminal; and
  in a case that the result of the determination indicates the received question is transmitted from the administrator terminal:

select a desired conversation history from a desired conversation history list, search for an answer to a question in the selected conversation history, and generate a question and answer search result screen including answers which were retrieved, the question and answer search result screen which was generated includes a conversation screen corresponding to conversation history which was selected and an answer sentence search result screen on which the displayed contents are editable, wherein the answers retrieved are displayed on the answer sentence search result screen in an order based on a calculated weightings of the answers, and wherein additional information including at least one of a number of times that a particular one of the answers has been presented to users in the past and a satisfaction level responded by the users with respect to the answer is displayed together with the answers.

2. The information processing apparatus of claim 1, wherein:

the circuitry is further configured to calculate a search score for each of the one or more answers including the word included in the question, and the answer transmitted to the user terminal in the case that the result of the determination indicates that the received question is transmitted from the user terminal is an answer whose search score is highest.

3. The information processing apparatus of claim 2, wherein:

the screen information includes at least one of a category of at least one of the one or more answers, a question corresponding to the at least one of the one or more answers, an alternative expression of the question corresponding to the at least one of the one or more answers, a number of times the at least one of the one or more answers is presented to the user in the past, a satisfaction level to the at least one of the one or more answers obtained from the user in the past, and a search score of the at least one of the one or more answers.

4. The information processing apparatus of claim 3, wherein, in the case that the result of the determination indicates that the received question is transmitted from the administrator terminal, the circuitry receives a content of an edit input through the screen displayed.

5. The information processing apparatus of claim 1, wherein:

the user terminal uses a first application programming interface (API) when transmitting the question, the administrator terminal uses a second API when transmitting the question, the second API being different from the first API, and the circuitry performs the determination based on which of the first API and the second API is used for transmission of the question.

6. The information processing apparatus of claim 1, wherein:

the user terminal and the administrator terminal transmit the question with different screen identification information respectively, and the circuitry performs the determination based on which of the different screen identification information is transmitted with the question.

7. The information processing apparatus of claim 1, wherein:

the answer of the one or more answers that is transmitted has a weighting satisfying a predetermined threshold value of the weighting to the user terminal.

8. An information processing method, comprising:

receiving a question from one of a user terminal and an administrator terminal, the user terminal being operated by a user, the administrator terminal being operated by an administrator;

performing determination as to whether the received question is transmitted from the user terminal or transmitted from the administrator terminal;

searching for one or more answers including a word included in the question;

calculating a weighting of each of the one or more answers;

in a case that a result of the determination indicates that the received question is transmitted from the user terminal, transmitting an answer of the one or more answers to the user terminal;

in a case that the result of the determination indicates the received question is transmitted from the administrator terminal;

selecting a desired conversation history from a desired conversation history list, searching for an answer to a question in the selected conversation history, and generating a question and answer search result screen including answers which were retrieved, the question and answer search result screen which was generated includes a conversation screen corresponding to conversation history which was selected and an answer sentence search result screen on which the displayed contents are editable, wherein the answers retrieved are displayed on the answer sentence search result screen in an order based on a calculated weightings of the answers, and wherein additional information including at least one of a number of times that a particular one of the answers has been presented to users in the past and a satisfaction level responded by the users with respect to the answer is displayed together with the answers.

9. The information processing method of claim 8, wherein:

the searching includes calculating a search score for each of the one or more answers including the word included in the question, and the answer transmitted to the user terminal in the case that the result of the determination indicates that the received question is transmitted from the user terminal is an answer whose search score is highest.

10. The information processing method of claim 9, wherein:

the screen information includes at least one of a category of at least one of the one or more answers, a question corresponding to the at least one of the one or more answers, an alternative expression of the question corresponding to the at least one of the one or more answers, a number of times the at least one of the one or more answers presented to the user in the past, a satisfaction level to the at least one of the one or more answers obtained from the user in the past, and a search score of the at least one of the one or more answers.

11. The information processing method of claim 10, further comprising:

receiving a content of an edit input through the screen displayed in the case that the result of the determination indicates that the received question is transmitted from the administrator terminal.

12. The information processing method of claim 8, wherein:
the user terminal uses a first API when transmitting the question,
the administrator terminal uses a second API when transmitting the question, the second API being different from the first API, and
the determination is performed based on which of the first API and the second API is used for transmission of the question.

13. The information processing method of claim 8, wherein:
the user terminal and the administrator terminal transmit the question with different screen identification information respectively, and
the determination is performed based on which of the different screen identification information is transmitted with the question.

14. The information processing method of claim 8, wherein:
the answer of the one or more answers that is transmitted has a weighting satisfying a predetermined threshold value of the weighting to the user terminal.

15. An information processing system comprising:
an information processing apparatus;
a user terminal, which is a terminal operated by a user, and
an administrator terminal, which is a terminal operated by an administrator,
the information processing apparatus including first circuitry configured to
receive a question from one of the user terminal and the administrator terminal,
perform determination as to whether the received question is transmitted from the user terminal or transmitted from the administrator terminal,
search for one or more answers including a word included in the question,
calculate a weighting of each of the one or more answers,
in a case that a result of the determination indicates that the received question is transmitted from the user terminal, transmit an answer of the one or more answers, and
in a case that the result of the determination indicates the received question is transmitted from the administrator terminal:
select a desired conversation history from a desired conversation history list,
search for an answer to a question in the selected conversation history, and
generate a question and answer search result screen including answers which were retrieved, the question and answer search result screen which was generated includes a conversation screen corresponding to conversation history which was selected and an answer sentence search result screen on which the displayed contents are editable,
wherein the answers retrieved are displayed on the answer sentence search result screen in an order based on a calculated weightings of the answers, and
wherein additional information including at least one of a number of times that a particular one of the answers has been presented to users in the past and a satisfaction level responded by the users with respect to the answer is displayed together with the answers.

16. The information processing system of claim 15, wherein:
the first circuitry of the information processing apparatus is further configured to calculate a search score for each of the one or more answers including the word included in the question, and
the answer transmitted to the user terminal in the case that the result of the determination indicates that the received question is transmitted from the user terminal is an answer whose search score is highest.

17. The information processing system of claim 16, wherein:
the screen information includes at least one of a category of at least one of the one or more answers, a question corresponding to the at least one of the one or more answers, an alternative expression of the question corresponding to the at least one of the one or more answers, a number of times the at least one of the one or more answers presented to the user in the past, a satisfaction level to the at least one of the one or more answers obtained from the user in the past, and a search score of the at least one of the one or more answers.

18. The information processing system of claim 17, wherein, in the case that the result of the determination indicates that the received question is transmitted from the administrator terminal, the first circuitry of the information processing apparatus receives a content of an edit input through the screen displayed.

19. The information processing system of claim 15, wherein:
the user terminal uses a first API when transmitting the question,
the administrator terminal uses a second API when transmitting the question, the second API being different from the first API, and
the first circuitry of the information processing apparatus performs the determination based on which of the first API and the second API is used for transmission of the question.

20. The information processing system of claim 15, wherein:
the user terminal and the administrator terminal transmit the question with different screen identification information respectively, and
the first circuitry of the information processing apparatus performs the determination based on which of the different screen identification information is transmitted with the question.

* * * * *